United States Patent
Franke et al.

(10) Patent No.: US 7,295,527 B2
(45) Date of Patent: Nov. 13, 2007

(54) SIGNAL ANALYZER AND METHOD FOR DISPLAYING POWER LEVELS OF CODE CHANNELS

(75) Inventors: Jens Franke, Germering (DE); Bernhard Nitsch, München (DE); Klaus Heller, Gauting (DE)

(73) Assignee: Rohde Schwarz GmbH & Co. KG, Munich (DE)

( * ) Notice: Subject to any disclaimer, the term of this patent is extended or adjusted under 35 U.S.C. 154(b) by 269 days.

(21) Appl. No.: 10/517,297

(22) PCT Filed: Apr. 29, 2003

(86) PCT No.: PCT/EP03/04465

§ 371 (c)(1),
(2), (4) Date: Dec. 7, 2004

(87) PCT Pub. No.: WO03/107566

PCT Pub. Date: Dec. 24, 2003

(65) Prior Publication Data

US 2006/0056359 A1    Mar. 16, 2006

(30) Foreign Application Priority Data

Jun. 14, 2002    (DE)  ................................ 102 26 640

(51) Int. Cl.
*H04B 1/02*      (2006.01)
*H04Q 7/20*     (2006.01)

(52) U.S. Cl. ...................... 370/310; 455/335; 455/342; 455/441

(58) Field of Classification Search ................ 375/241, 375/318, 328, 335, 342, 441, 299, 347; 455/101, 455/522, 566, 562.1; 702/60–62; 370/241, 370/318, 328, 335, 242, 441
See application file for complete search history.

(56) References Cited

U.S. PATENT DOCUMENTS

| | | | |
|---|---|---|---|
| 6,219,340 B1 | 4/2001 | Cutler et al. | |
| 6,519,227 B1 | 2/2003 | Koizumi | |
| 6,850,238 B2 * | 2/2005 | Bryant et al. ............ | 345/440.1 |
| 6,879,576 B1 * | 4/2005 | Agrawal et al. ............ | 370/342 |
| 2002/0085522 A1 | 7/2002 | Huber | |

(Continued)

FOREIGN PATENT DOCUMENTS

DE    199 55 564 A1    5/2000

(Continued)

*Primary Examiner*—Simon Nguyen
(74) *Attorney, Agent, or Firm*—Ditthavong Mori & Steiner, P.C.

(57) ABSTRACT

A signal analyzer and a method for displaying code-channel power levels of CDMA (Code Division Multiple Access) signal that contains code changes having different spreading factors. The individual code-channel power level is measured from a received signal and displayed in a diagram for a specified base spreading factor. The code channels having an alias power level are indicated. A code channel, with regard to the specified base spreading factor, has an alias power level when the code channel having the base spreading factor is inactive and when a code channel of a higher spreading factor (corresponding to the former code channel) is active, or, in the event of orthogonal transmit diversity, the power level of a code channel is mapped onto the code channel of the base spreading factor.

9 Claims, 6 Drawing Sheets

U.S. PATENT DOCUMENTS

2003/0039264 A1* 2/2003 Hando ................. 370/441
2003/0063586 A1* 4/2003 Engholm et al. ........... 370/335

FOREIGN PATENT DOCUMENTS

| DE | 100 56 258 A1 | 5/2002 |
| EP | 1 259 013 A1 | 12/2000 |
| EP | 1 304 822 A1 | 4/2004 |
| WO | WO 01/95535 A1 | 12/2001 |

* cited by examiner

SIGNAL ANALYZER AND METHOD FOR DISPLAYING POWER LEVELS OF CODE CHANNELS

FIELD OF THE INVENTION

The invention relates to a signal analyzer and a method for displaying the power level of code channels of a CDMA (Code Division Multiple Access) signal.

BACKGROUND OF THE INVENTION

In the context of checking the components of third-generation mobile telephone systems, it is necessary to determine the power level of the individual code channels, of which the overall signal is made up. The relevant power levels of the code channels are presented graphically to evaluate the measured power levels of the individual code channels. A graphic presentation of this kind of the power levels of individual code channels is disclosed, for example, in U.S. Pat. No. 6,219,340 B1.

According to U.S. Pat. No. 6,219,340 B1, the individual power levels of the relevant active code channels are presented in the form of a bar diagram. In this diagram, the individual channels are plotted along the X-axis in such a manner that the code channels belonging to each code class are arranged adjacent to one another. The power level measured for each code channel is shown by the height of the bar. The membership of the individual code channels in a given code class, that is to say, their association with a given spreading factor (SF), is shown, in the presentation proposed, in that, corresponding to the lower spreading factor in the lower code class, the bar allocated in the presentation is wider for the corresponding code channel of the lower code class. Moreover, U.S. Pat. No. 6,219,340 B1 proposes that inactive code channels are indicated in the presentation by a dash. In this context, inactive channels are understood to be all code channels, which do not contribute to the data transmission.

The presentation of a measured CDMA signal proposed in U.S. Pat. No. 6,219,340 B1 has the disadvantage that it is not possible to distinguish whether a code channel in a code class is actually active, or whether the code channel is inactive but the power level of a corresponding code channel of a higher spreading factor is measurable there. A lack of discrimination of this kind between an actual power level of an active code channel and a so-called alias power level of an inactive code channel in a code class, which is lower than the actual code class of the active code channel, considerably impairs the evaluation of the overall CDMA signal.

SUMMARY OF THE INVENTION

There exists a need to create a signal analyser and a method for displaying the code-channel power levels of a CDMA signal, wherein a distinction can be made between a power level, which actually originates from an active code channel, and an alias power level.

According to one aspect of the invention, those code channels relating to a specific base spreading factor which are inactive, but for which a so-called alias power level occurs, are specially marked in a diagram, which presents the power levels occurring in the individual code channels. In evaluating the individual power levels of the code channels, it is therefore possible to distinguish simply between actually active code channels and code channels, which are inactive in the specified base spreading factor. This distinction is also possible, if the actually inactive channels show a measurable power level in the form of an alias power level.

In particular embodiments, it is advantageous to select a bar diagram for the presentation of the power level of the individual code channels, and to present those bars of the code channels, in which an alias power level is measurable, in a different color. With this color marking, it is possible to infer simply from the diagram which code channels provide an alias power level, which actually originates from code channels of a higher code class. In this way, the information regarding the level of the power level actually measured is retained.

Moreover, it is particularly advantageous, in the event of an occurrence of an alias power level of this kind, to switch automatically, in response to an entry by an operator, to the presentation of that code class, which contains the code channels causing the alias power level. Starting from a presentation of the code class with the basic spreading factor, the operator can then immediately recognise the code class, from which the alias power level occurring in a lower code class actually originates. A further simplification is possible if, when switching to a presentation with a higher spreading factor, the code channel, which shows an alias power level, is marked with a marking device, which is allocated to the corresponding code channel causing the alias power level.

With another marking, for example, a differently colored marking, it is also possible, when using several antennae of the same transmission unit, to which mutually orthogonal codes are allocated, to distinguish whether the alias power level originates from a signal of the same antenna or from a code channel of the other antenna. The use of different markings for code channels, which provide alias power levels of different origins, allows the corresponding causes for the alias power level to be distinguished in a simple manner.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

One preferred exemplary embodiment of the invention is presented in the drawings and explained in greater detail below. The drawings are as follows.

DETAILED DESCRIPTION OF THE PREFERRED EMBODIMENT

With a third-generation mobile telephone system, a base station communicates with several mobile devices, the various mobile stations transmitting information simultaneously to the base station and vice versa. The individual signals sent to or from the mobile stations are distinguished by allocating corresponding codes to the subscribers, the corresponding codes being mutually orthogonal. The number of items of information to be transmitted per unit of time can be varied in dependence upon the spreading factor SF, upon which the code is based. To exploit the transmission capacity to the maximum, the signal actually received and/or transmitted by the base station consists of code channels, which provide different spreading factors.

Figure 1:
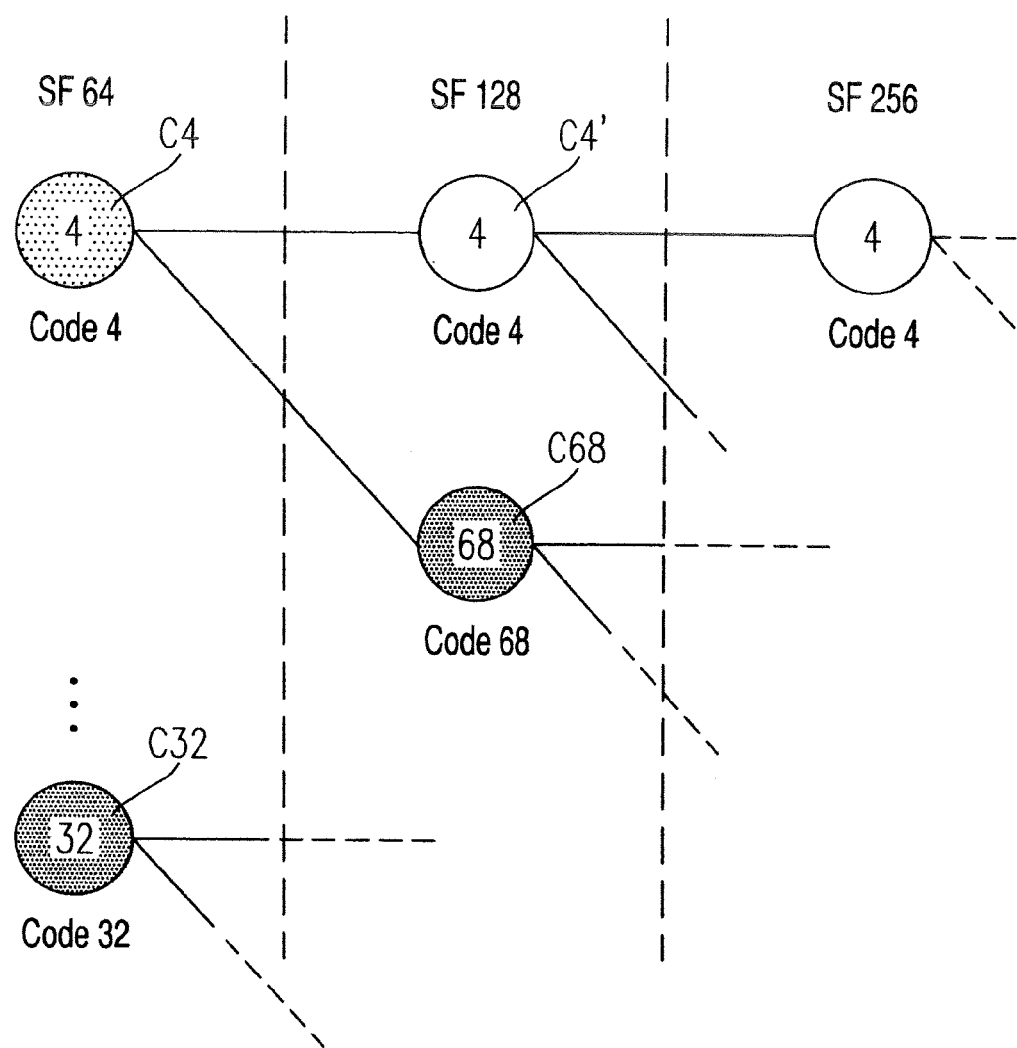
FIG. 1 shows a schematic presentation of the occurrence of an alias power level.

Each code of a given spreading factor branches again in the plane of the next higher spreading factor into two orthogonal codes. FIG. 1 illustrates this by way of example for the code 4 with a spreading factor 64 (reference C4). In the next higher code class, that is, with a spreading factor 128, the code 4 is subdivided into a code 4 with spreading factor 128 (reference C4') and a code 68 with the spreading factor 128 (reference C68). FIG. 1 shows a detail of a code tree diagram with three code classes with the spreading factors 64, 128 and 256 respectively.

The code 32 relating to spreading factor 64 (C32), shown schematically in FIG. 1 with dark shading, and code 68 relating to spreading factor 128 (C68) are active. When measuring the signal with the assistance of a signal analyser, which presents each measured power level of the code channels relating to the spreading factor 64, the power level of the active code channel 32 is presented with an additional power level for the code channel 4. In this context, the power level of the code channel 4 is a so-called alias power level, which also occurs with an inactive code channel 4 and originates from an actually active code channel 68 of the spreading factor 128. The code channel 4 of the spreading factor 128, however, is actually inactive. In the diagrams, inactive code channels are represented by empty circles.

Figure 2:
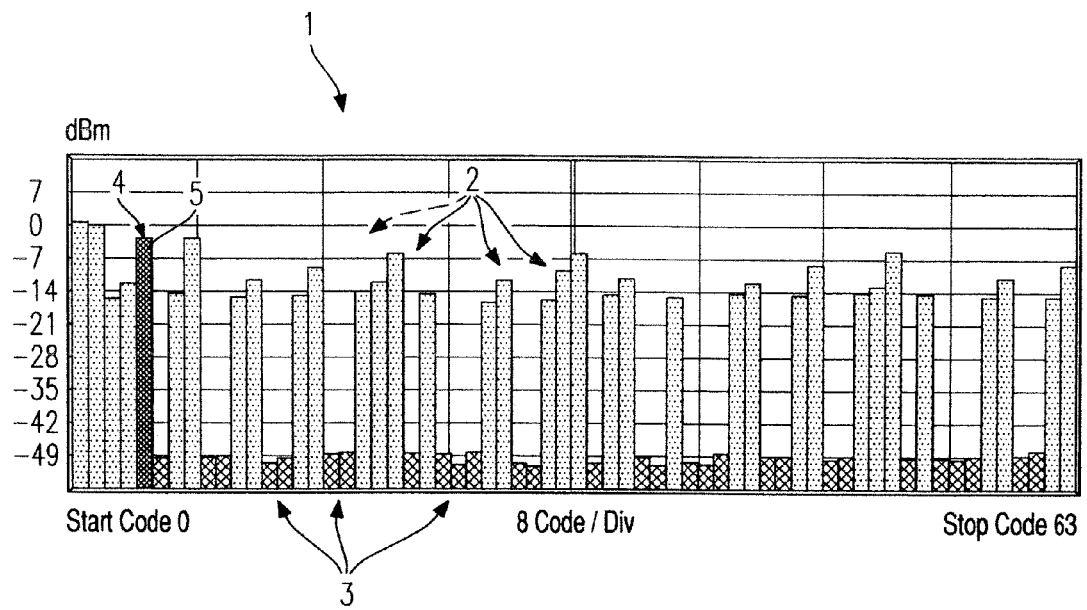
FIG. 2 shows a presentation of measured power levels of code channels with an alias power level for a base spreading factor.

FIG. 2 shows a presentation of the power levels of the individual code channels for the basic spreading factor 64. In this presentation as a bar diagram, the individual code channels are plotted horizontally, so that the height of the bars allocated to the individual code channels indicates the measured power level for each code channel. Code channels, which are actually active in the code class presented are marked with the reference 2 in FIG. 2 and are presented, for example, in a given color. The code channels, which are inactive with a basic spreading factor of 64 are preferably presented in another color and are shown in FIG. 2 by way of example with the reference 3.

As already explained in the context of FIG. 1, the code channel C4, which provides an alias power level, is labelled with the reference 5 in FIG. 2 and is marked in a special manner by the display device 1. For example, with the bar diagram selected in FIG. 2, a differently colored bar may be used for this purpose. Furthermore, a marking 4 is shown in FIG. 2, which can be allocated by the operator of the measuring device to any desired code channel. In the example presented, the marking 4 is allocated to the color-marked code channel C4 (reference 5).

Figure 3:
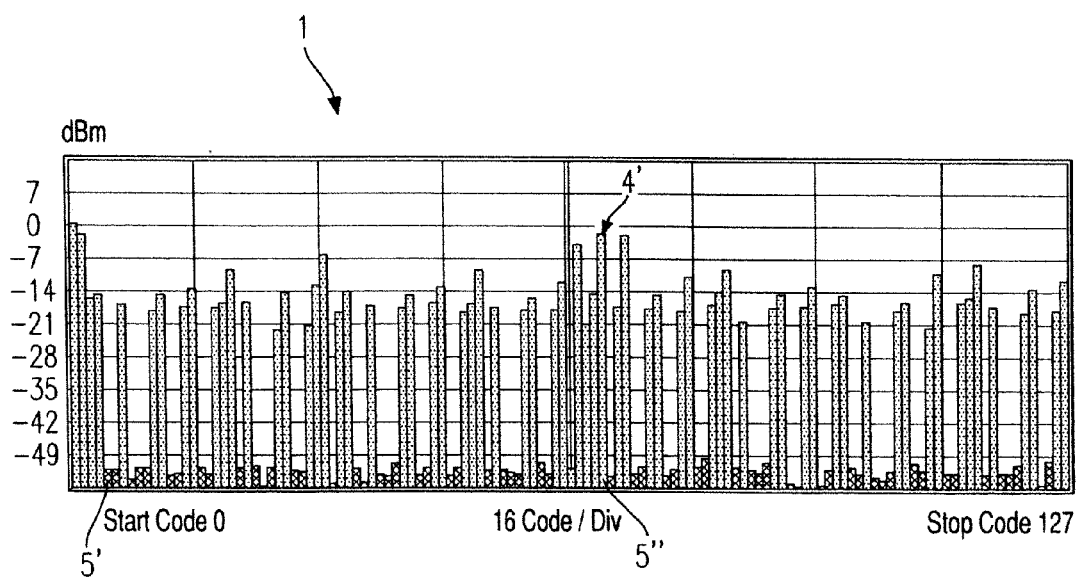
FIG. 3 shows a presentation of the power levels of the code channels from FIG. 2 for a higher spreading factor.

FIG. 3 provides a presentation of the measured results, as already shown in FIG. 2, for a spreading factor 128, that is to say, for the next higher code class. As already explained in the context of FIG. 1, in the presentation relating to the spreading factor 128, an unambiguous distinction must be made between the code channel C68 and the code channel C4'. Accordingly, the display device 1 displays only a slight noise power level for the code channel C4' labelled with the reference 5', which is synonymous with the statement that the code C4' is actually inactive. By contrast, a relatively high power level is indicated for the code channel C68 labelled with the reference 5", which means that the code channel C68 is actually active and has therefore caused the alias power level of the code channel C4 with spreading factor 64. Since the code channel C68 provides an actual power level rather than an alias power level, the bar allocated to the code channel C68 is now no longer marked with a special color. On the contrary, it is shown with the same color as all other active code channels relating to the spreading factor 128. To make it easier to locate the corresponding code channel, the marking 4 from FIG. 2 is set as the marking 4' on the code channel C68 in FIG. 3. This displacement of the marking 4, 4' corresponds to the occurrence of the alias power level on the basis of the code generation according to the Hadamard matrix.

Other presentations are also possible instead of the preferred presentation in a bar diagram with special coloring of the corresponding code channels, for example, arrow diagrams or line diagrams etc. It is also possible to mark a code channel, which provides an alias power level, by other means than coloring. For example, shading, a border arranged around the bar, a flashing bar or arrow may be considered.

Figure 4:
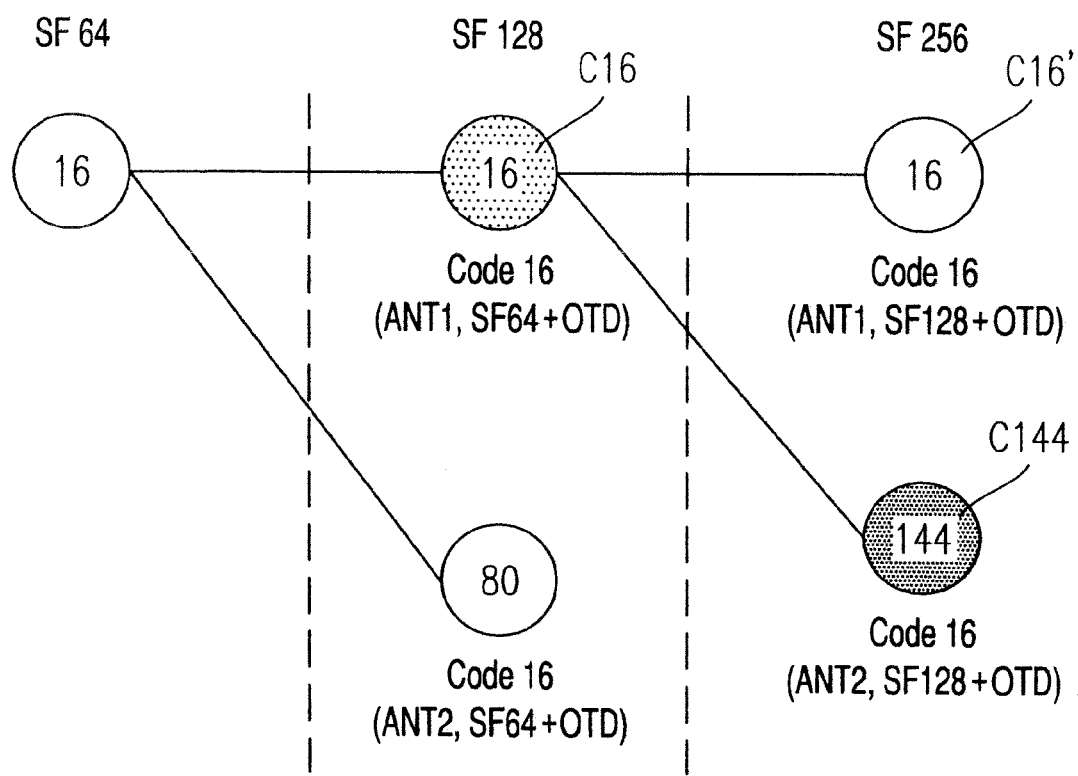
FIG. 4 shows a schematic presentation of the occurrence of an alias power level through the use of two antennae.

FIG. 4 presents a further possibility for the occurrence of the alias power level, as it arises in transmission units with two antennae, wherein the antennae each use codes, which are mutually orthogonal (Orthogonal Transmit Diversity OTD)). In this context, the channels of a first antenna ANT1 and a second antenna ANT2 are each spread with an additional orthogonal spreading factor. This means that the code channels are actually disposed in a plane of the code tree diagram with a doubled spreading factor.

In FIG. 4, this is shown by way of example for the code channel 16 of antenna ANT1 with spreading factor 64. As indicated by the empty circle, the code channel C16' of the antenna ANT1 with spreading factor 128 and Orthogonal Transmit Diversity is inactive. The code channel C144 (Code 16, antenna ANT2, spreading factor SF128 with OTD), however, is active. Accordingly, the power level of the code channel C144 is measured as the alias power level of the code channel C16 (Code 16, antenna ANT1, spreading factor SF64 with OTD). A corresponding presentation on a display device 1 is again shown in FIG. 5, for a basic spreading factor 64. The only-apparently-active code channel C16 is labelled in FIG. 5 with reference 6 and highlighted by the use of another color in the bar diagram. The marker 7, allocated in FIG. 5 to the code channel C16, is again, in the presentation relating to the spreading factor 128 shown in FIG. 6, allocated to the code channel C16', which does not now provide an alias power level and is accordingly shown as inactive. In the presentation shown, all code channels belonging to the antenna ANT1 are presented in such a manner that the code channel causing the alias power level is not recognisable.

Figure 7:
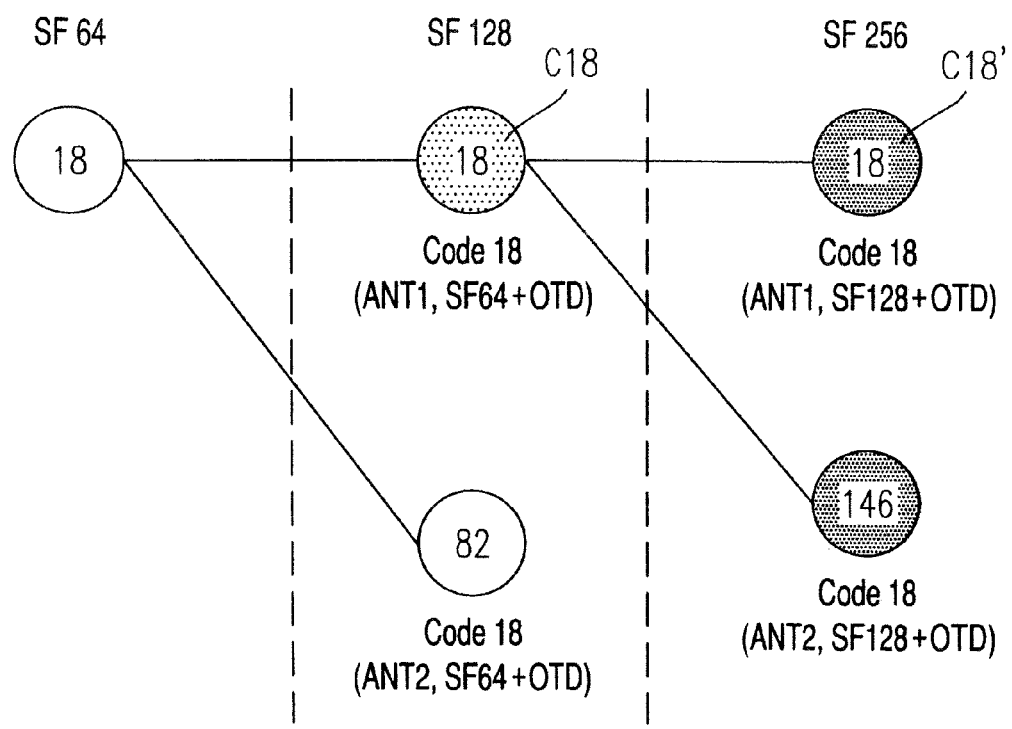
FIG. 7 shows a further schematic presentation of the occurrence of an alias power level and FIG. 8 shows a block circuit diagram of a signal analyzer according to the invention.

FIG. 7 shows, by way of example, the occurrence of an alias power level through the active code channels of a higher code class and simultaneous use of Orthogonal Transmit Diversity. In code channel 18 in this diagram (Code 18, antenna ANT1, spreading factor SF64 with OTD), a power level with the next higher spreading factor, which originates from code channel 18 of the next code class (antenna ANT1, spreading factor SF128) with Orthogonal Transmit Diversity, can be identified, and also a power level, which originates from code channel 18 of antenna ANT2 with spreading factor 128 with OTD. Both power levels are mapped in the code channel C18 of the antenna ANT1 with spreading factor SF64 with Orthogonal Transmit Diversity and accordingly marked in color in a diagram, which presents the power level distribution of the individual code channels, wherein the marking corresponds, preferably in dependence upon the application, either to the marking of alias power levels of a higher code class or of alias power levels through OTD.

Figure 8:
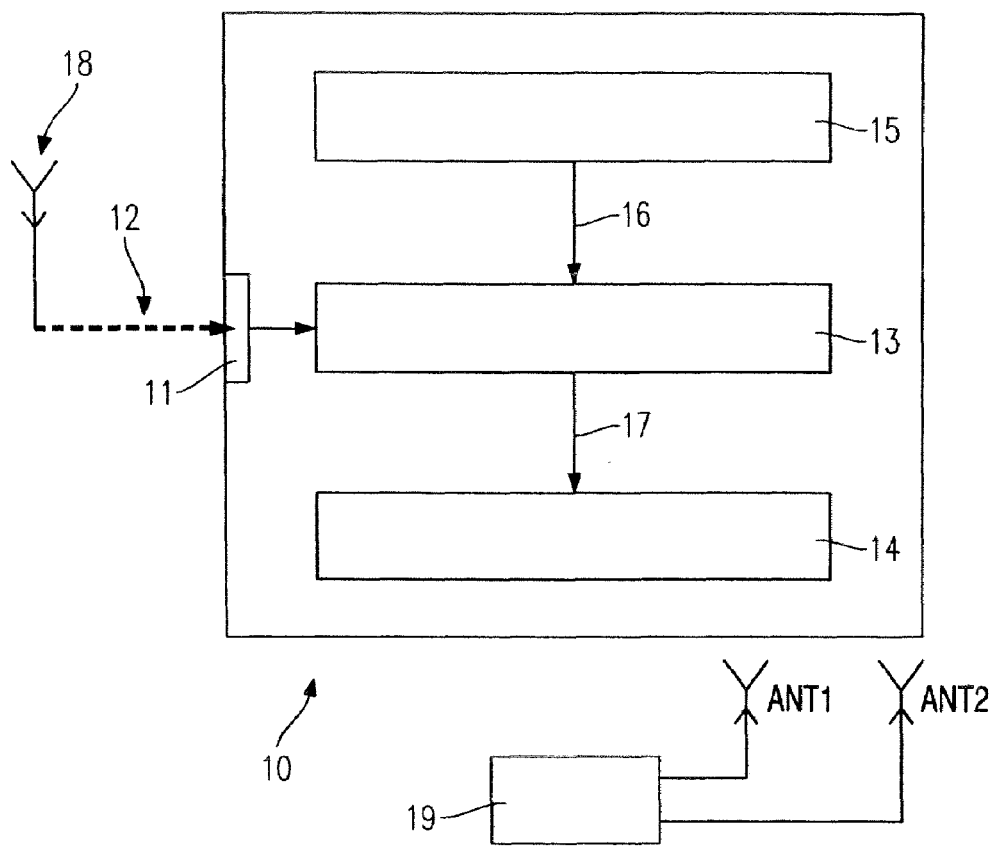

FIG. 8 shows a schematic presentation of a signal analyser according to the invention. The signal analyser 10 according to the invention has an input connection 11, to which a CDMA signal 12 to be measured is connected. The input connection may be either an antenna connection for the antenna 18 or a connection for a signal line. The incoming signal 12 is supplied from the input connection 11 to an analysis device 13. In the analysis device 13, the incoming CDMA signal is analysed, so that the actual power level is determined for all active code channels and accordingly, the active code channels can be allocated to the code classes. To display the measured power level of the individual code channels on a display device 14, an entry is implemented by the operator in an operating field 15, which is supplied via a connection 16 to the analysis device. The presentation parameters entered in the operating field 15 contain, for example, the selection of specified base spreading factors for the display.

Figure 5:
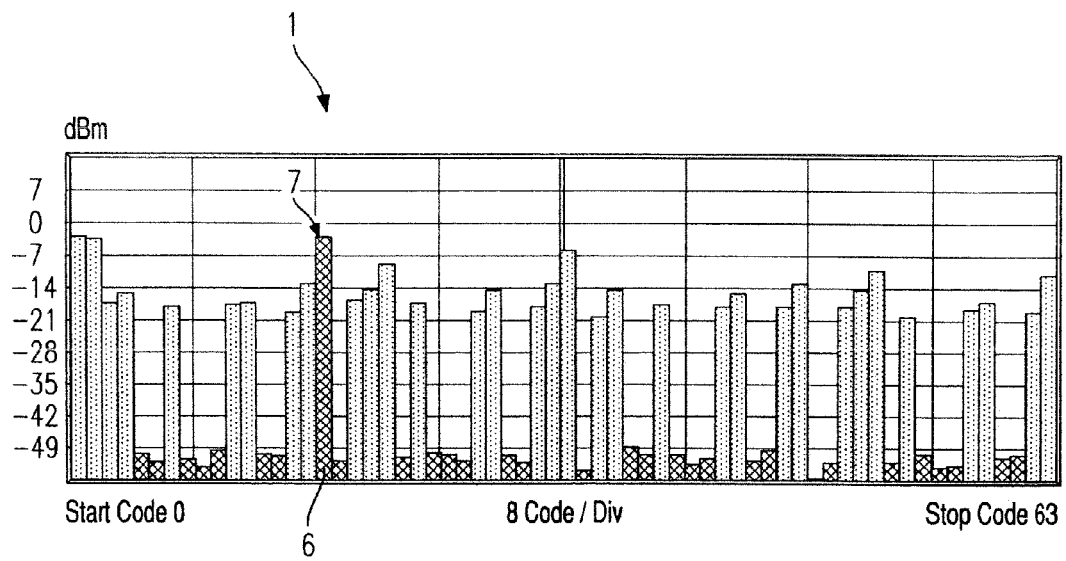
FIG. 5 shows a presentation of the power levels of the code channels for a base spreading factor in a bar diagram.
Figure 6:
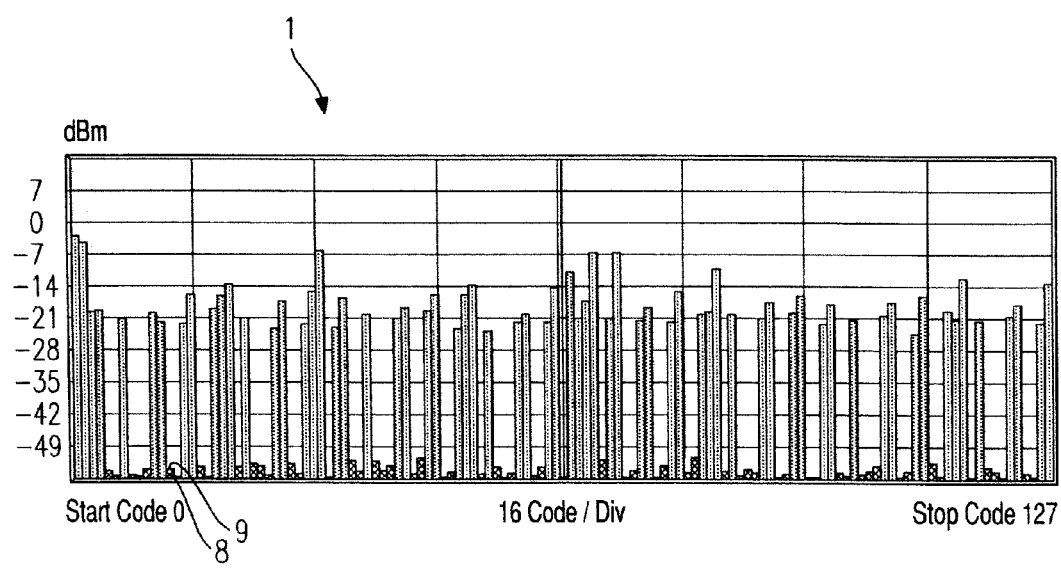
FIG. 6 shows a presentation of the power levels of the code channels from FIG. 5 for a higher spreading factor.

The power levels of the code channels to be presented for a specified base spreading factor are communicated by the analysis device 13 via a further connecting line 17 to the display device 14, on which, once again, the measured power levels of the individual code channels are displayed in a presentation corresponding to the presentation from FIG. 2, FIG. 3, FIG. 5 and/or FIG. 6.

If the operator recognises, on the basis of the color presentation of code channels, that a code channel provides an alias power level, he can make an entry via the operating field 15, in response to which, the analysis device 13 communicates to the display device 14 the information required for a modified presentation of a higher code class with the corresponding higher spreading factor SF. A presentation relating to the smallest spreading factor, for which no alias power level occurs in the code channels, can also be selected automatically. The presentation for a given spreading factor can also be selected directly via the entry, instead of an automatic switching of the presentation relating to a spreading factor.

Furthermore, FIG. 8 illustrates the case, in which a transmitter 19 transmits via two generally spatially offset antennae ANT1 and ANT2, wherein the codes used are spread into the next higher code class, as described above.

While the present invention has been described in connection with a number of embodiments and implementations, the present invention is not so limited but covers various obvious modifications and equivalent arrangements, which fall within the purview of the appended claims.

What is claimed is:

1. A method for displaying power levels of code channels of a CDMA (Code Division Multiple Access) signal, said code channels having different spreading factors, comprising:

receiving the CDMA signal;

measuring the power levels of the code channels of the CDMA signal;

displaying the measured power levels of the code channels for a specified base spreading factor in a diagram; and marking those code channels, which provide an alias power level, wherein a code channel provides an alias power level relating to the specified base spreading factor when the code channel with the specified base spreading factor is inactive, and a code channel of a higher spreading factor corresponding thereto is active, when measuring a CDMA signal from a transmitter with a first antenna and a second antenna, which use mutually orthogonal codes, marking a code channel with the spreading factor of the first antenna, in which an alias power level occurs, which is an actual power level of an active code channel of the second antenna, differently from a code channel with an alias power level, which is an actual power level of a code channel with a higher spreading factor of the same antenna.

2. A method according to claim 1, wherein the power levels of the code channels are displayed in a bar diagram.

3. A method according to claim 1, wherein those code channels which provide an alias power level, are marked in color.

4. A method according to claim 1, further comprising automatically displaying the power levels of the code channels after a user entry, with the highest spreading factor that contains an active code channel.

5. A method according to claim 1, further comprising:

assigning a marking allocated to a code channel providing an alias power level, in the case of a change to a higher spreading factor, to a code channel causing the alias power level.

6. A signal analyzer for measuring a plurality of power levels of respective code channels of a CDMA (Code Division Multiple Access) signal, comprising:

an analysis device for evaluating the power level of the individual code channels; and a display device for visual presentation of the power levels of the individual code channels of a given basic spreading factor in a diagram, wherein those code channels relating to the specified base spreading factor, which are inactive and for which an alias power level is measurable, are marked in the diagram, an alias power level being present, if a code channel of a higher spreading factor, which corresponds to an inactive code channel relating to a specified base spreading factor, is active, wherein in analyzing a CDMA signal of a transmitter with a first antenna and a second antenna, which use mutually orthogonal codes, those code channels of an antenna, for which an alias power level is measurable, which is caused by an active code channel of the other antenna, are presented differently from code channels with a measurable alias power level, which is caused by an active code channel of a higher spreading factor of the same antenna.

7. A signal analyzer according to claim 6, wherein the power levels of the code channels is presented in a bar diagram.

8. A signal analyzer according to claim 6, wherein the inactive code channels of the specified base spreading factor, for which an alias power level is measurable, are marked in the diagram in a different color from the active code channels of the specified base spreading factor.

9. A signal analyzer according to claim 6, wherein the code channels relating to the maximum spreading factor, which contains an active code channel, are automatically presented on the display device.

* * * * *